United States Patent
Zhao et al.

(10) Patent No.: US 9,122,109 B2
(45) Date of Patent: Sep. 1, 2015

(54) BLUE PHASE LIQUID CRYSTAL DISPLAY DEVICE AND MANUFACTURING METHOD THEREOF

(75) Inventors: Weili Zhao, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 13/470,640

(22) Filed: May 14, 2012

(65) Prior Publication Data

US 2012/0293738 A1 Nov. 22, 2012

(30) Foreign Application Priority Data

May 20, 2011 (CN) .......................... 2011 1 0132300

(51) Int. Cl.
| | | |
|---|---|---|
| G02F 1/1343 | (2006.01) | |
| G02F 1/137 | (2006.01) | |
| G02F 1/141 | (2006.01) | |
| G09G 3/36 | (2006.01) | |
| C09K 19/02 | (2006.01) | |

(52) U.S. Cl.
CPC .......... G02F 1/134363 (2013.01); G02F 1/137 (2013.01); G02F 2001/13793 (2013.01); G02F 2001/134318 (2013.01); G02F 2001/134381 (2013.01)

(58) Field of Classification Search
CPC .............. G09G 3/3614; G09G 3/3648; G09G 2310/06; G09G 2300/0426; G09G 3/3659; G09G 2330/021; G02F 1/13306; G02F 1/133528; G02F 1/133707; G02F 1/134309; G02F 2001/134318; G02F 2001/133531; G02F 2001/134381; G02F 2001/13793
See application file for complete search history.

(56) References Cited

U.S. PATENT DOCUMENTS

| 7,830,485 B2 * | 11/2010 | You et al. ...................... 349/141 |
| 2007/0052902 A1 * | 3/2007 | Yoo et al. ...................... 349/144 |
| 2007/0171336 A1 * | 7/2007 | Kim et al. ..................... 349/102 |
| 2008/0094555 A1 * | 4/2008 | Wu et al. ....................... 349/114 |
| 2009/0225017 A1 * | 9/2009 | Kim et al. ........................ 345/88 |
| 2010/0321600 A1 * | 12/2010 | Miyachi et al. ................. 349/41 |
| 2011/0075074 A1 | 3/2011 | Gauza et al. |

FOREIGN PATENT DOCUMENTS

CN 102031121 A 4/2011

OTHER PUBLICATIONS

First Chinese Office Action dated Apr. 16, 2014; Appln. No. 201110132300.1.
Chinese Rejection Decision dated Sep. 10, 2014; Appln. No. 201110132300.1.
Chinese Notification of Reexamination dated May 4, 2015; Appln. No. 201110132300.1.

* cited by examiner

*Primary Examiner* — Paisley L Arendt
*Assistant Examiner* — Angela Davison
(74) *Attorney, Agent, or Firm* — Ladas & Parry LLP

(57) ABSTRACT

An embodiment of the disclosed technology provides a blue phase liquid crystal display device, comprising: a lower polarizer; a thin film transistor substrate, formed above the lower polarizer; a color filter substrate, disposed above and opposite to the thin film transistor substrate; an upper polarizer, formed above the color filter substrate; a plurality of pixel electrodes, disposed on a surface of the thin film transistor substrate facing the color filter substrate and protruded toward the color filter substrate, wherein negative pixel electrodes and positive pixel electrodes are alternately disposed; a plurality of common electrodes, disposed on the color filter substrate; and a blue phase liquid crystal layer, provided between the thin film transistor substrate and the color filter substrate.

8 Claims, 2 Drawing Sheets

BLUE PHASE LIQUID CRYSTAL DISPLAY DEVICE AND MANUFACTURING METHOD THEREOF

BACKGROUND

One or more embodiments of the disclosed technology relate to a blue phase liquid crystal display device and a manufacturing method thereof.

The blue phase of liquid crystal is one phase of liquid crystal between the cholesteric phase and the isotropy phase. The blue phase liquid crystal has the following advantages: (1) a relatively quick response speed (smaller than 1 ms), because of which field-sequential color control for color filters may be omitted; (2) image display directly based on the electric birefringence principle without an alignment layer and a rubbing treatment; (3) excellent isotropic property without application of an electric field; and (4) no light leakage in a dark state and excellent viewing angle property. Therefore, the blue phase liquid crystal display device will be a promising product for the next-generation display. Most of the current blue phase liquid crystal display devices are driven in a conventional IPS (In-Plane Switching) mode, in which only a horizontal electric field is generated above a thin film transistor substrate after applying a driven voltage and the liquid crystals exist in a dual-domain distribution, and thus, a relatively high driving voltage is needed to obtain a required strength of the horizontal electric field.

SUMMARY

An embodiment of the disclosed technology provides a blue phase liquid crystal display device, comprising: a lower polarizer; a thin film transistor substrate, formed above the lower polarizer; a color filter substrate, disposed above and opposite to the thin film transistor substrate; an upper polarizer, formed above the color filter substrate; a plurality of pixel electrodes, disposed on a surface of the thin film transistor substrate facing the color filter substrate and protruded toward the color filter substrate, wherein negative pixel electrodes and positive pixel electrodes are alternately disposed; a plurality of common electrodes, disposed on the color filter substrate, wherein the orthographic projections of the common electrodes and the pixel electrodes on a same plane are alternately disposed at an interval; and a blue phase liquid crystal layer, provided between the thin film transistor substrate and the color filter substrate, wherein the positive pixel electrodes are applied with a voltage larger than that of the common electrodes, and the negative pixel electrodes are applied with a voltage smaller than that of the common electrode.

Another embodiment of the disclosed technology further provides a method for manufacturing a blue phase liquid crystal display device, comprising: providing a thin film transistor substrate; providing a color filter substrate disposed above and opposite to the thin film transistor substrate; foaming a plurality of pixel electrodes disposed on a surface of the thin film transistor substrate facing the color filter substrate and protruded toward the color filter substrate, wherein negative pixel electrodes and positive pixel electrodes are alternately disposed; forming a plurality of common electrodes disposed on the color filter substrate so that the orthographic projections of the common electrodes and the pixel electrodes on a same plane are alternately disposed at an interval; and providing a blue phase liquid crystal layer between the thin film transistor substrate and the color filter substrate, wherein the positive pixel electrodes are applied with a voltage larger than that of the common electrodes, and the negative pixel electrodes are applied with a voltage smaller than that of the common electrode.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

It should be understood that the embodiments described below are only a part of, not all of, the embodiments of the disclosed technology. Based on the described embodiments, any other embodiments that can be conceived by those skilled in the relevant technical field without inventive works should be fallen within the spirit and scope of the disclosed technology also.

One or more of the technical problems to be solved, the technical solution and the advantages of the disclosed technology will be obvious from the detailed explanation about the specific embodiments with reference to the accompanying drawings.

Figure 1:
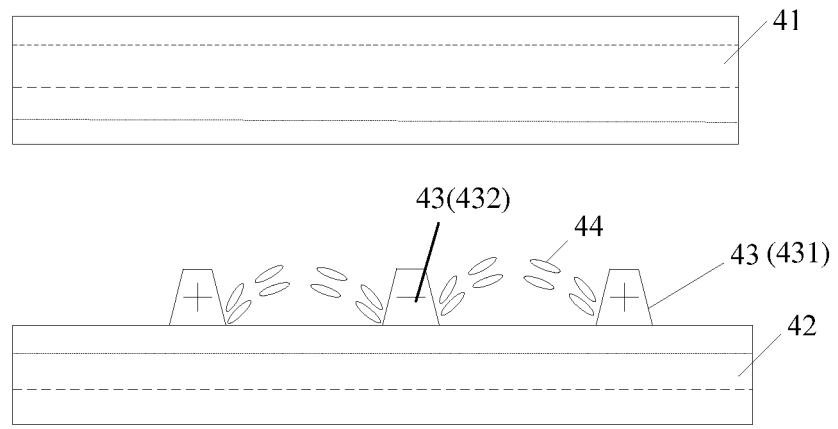
FIG. 1 is a schematic view showing the state of the liquid crystal cell of a conventional liquid crystal display device driven in an IPS mode when it is applied with a voltage.

FIG. 1 is a schematic view showing the state of the liquid crystal cell of a conventional liquid crystal display (LCD) device driven in an IPS mode when it is applied with a voltage. As shown in FIG. 1, in the conventional blue phase LCD device, a common electrode is not provided on a color filter substrate 41, only positive electrodes 431 and negative electrodes 432, which are alternately arranged, of pixel electrodes 43 are provided on a thin film transistor substrate 42 facing the color filter substrate 41, and thus, when a voltage is applied across the positive electrodes 431 and negative electrodes 432, only a horizontal electric filed is formed above the thin film transistor substrate 42 and the liquid crystal molecules 44 are distributed in a dual-domain mode.

One or more embodiments of the disclosed technology provide a blue phase liquid crystal display device, in which a driving voltage of the blue phase liquid crystal can be decreased, and a manufacturing method thereof.

An embodiment of the disclosed technology provides a blue phase liquid crystal display device, including: a lower polarizer; a thin film transistor (TFT) substrate, formed above the lower polarizer; a color filter substrate, disposed on and opposite to the thin film transistor substrate; an upper polarizer, formed above the color filter substrate; a plurality of pixel electrodes, disposed on a surface of the thin film transistor substrate facing the color filter substrate and protruded toward the color filter substrate, wherein negative pixel electrodes and positive pixel electrodes are alternately disposed; a plurality of common electrodes, disposed on the color filter substrate; and a blue phase liquid crystal layer, provided between the thin film transistor substrate and the color filter substrate. The orthographic projections of the common electrodes on the color filter substrate and the pixel electrodes on the TFT substrate on the same parallel plane (e.g., the surface plane of the TFT substrate) are alternate at an equal interval between each other. The pixel electrodes which are applied a voltage larger than that of the common electrodes are the positive pixel electrodes, while the pixel electrodes which are applied a voltage smaller than that of the common electrode are the negative electrodes.

In one example, the thin film transistor substrate comprises: a lower glass substrate, as a base substrate, formed on the lower polarizer; and a lower insulation layer, formed on the lower glass substrate. In one example, the color filter substrate comprises: an upper glass substrate, as a base substrate, formed below the upper polarizer; a color filter layer, formed below the upper glass substrate; and an upper insulation layer, formed below the color filter layer. The color filter layer for example comprises red color filters, green color filters, and blue color filters.

In one example, the pixel electrodes are arranged at an equal interval on the lower insulation layer, the common electrodes are arranged at an equal interval on the upper insulation layer, and the orthographic projections of the pixel electrodes and the common electrodes on the same parallel plane are alternately disposed with an equal interval between each other. Thus, the production cost can be decreased and the process can be simplified.

Hereafter, a blue phase liquid crystal display device according to an embodiment of the disclosed technology is further explained with reference to FIG. 2.

Figure 2:
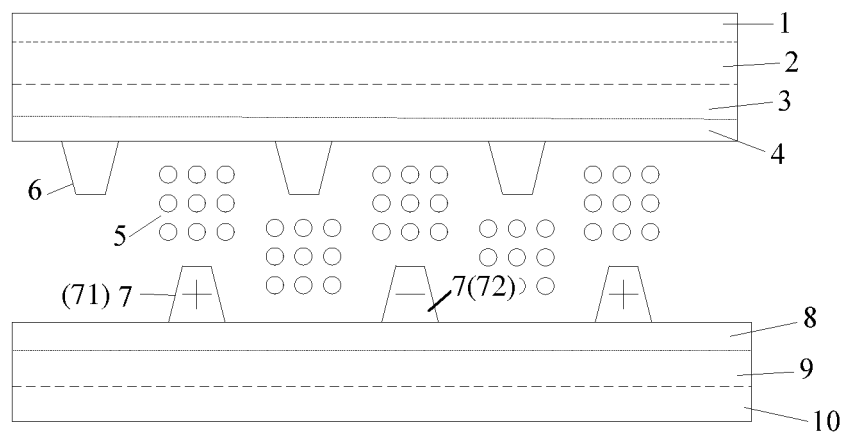
FIG. 2 is a schematic view for showing a state of a liquid crystal cell when a blue phase liquid crystal display device is not applied with driving voltages according to an embodiment of the disclosed technology.

As shown in FIG. 2, the blue phase liquid crystal display device from up to down comprises an upper polarizer 1, an upper glass substrate 2, a color filter layer 3, an upper insulation layer 4, common electrodes 6, a blue phase liquid crystal layer 5, pixel electrodes 7 (71, 72), a lower insulation layer 8, a lower glass substrate 9, and a lower polarizer 10. The lower surface of the upper polarizer 1 is adhered to the upper surface of the upper glass substrate 2, the lower surface of the upper glass substrate 2 is adhered to the upper surface of the color filter layer 3, the lower surface of the color filter layer 3 is adhered to the upper surface of the upper insulation layer 4, the protruded common electrodes 6 are disposed on the lower surface of the upper insulation layer 4, the upper insulation layer 4 faces the upper surface of the lower insulation layer 8, the protruded pixel electrodes 7 are disposed on the upper surface of the lower insulation layer 8, the lower surface of the lower insulation layer 8 is adhered to the upper surface of the lower glass substrate 9, and the lower surface of the lower glass substrate 9 is adhered to the upper surface of the lower polarizer 10. The lower and upper glass substrates as base substrates can be replaced with other kinds of suitable substrates, such as plastic or quartz substrates.

Figure 3:
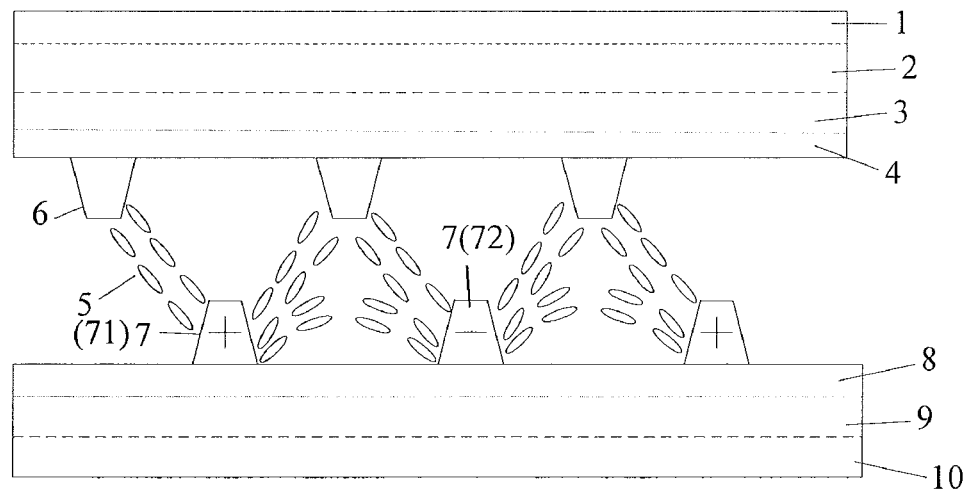
FIG. 3 is a schematic view for showing a state of the liquid crystal cell when the blue phase liquid crystal display device is applied with driving voltages according to an embodiment of the disclosed technology.

As shown in FIG. 3, the common electrodes 6 are arranged at an equal interval on the lower surface of the upper insulation layer 4, the pixel electrodes 7 are arranged at an equal interval on the upper surface of the lower insulation layer 8, and the orthographic projections of the common electrode 6 and the pixel electrode 7 on a plane (e.g., the upper surface plane of the lower glass substrate 9) parallel to the upper glass substrate 2 are alternate to each other so that distances of the common electrode 6 from adjacent two pixel electrodes 7 are equal to each other. Herein, positive pixel electrodes 71 and negative pixel electrodes 72 are alternately disposed on the lower insulation layer 8, that is, two adjacent pixel electrodes have opposite polarities (the voltage applied to the positive pixel electrodes 71 is larger than that of the common electrodes, and the voltage applied to the negative pixel electrodes is smaller than that of the common electrodes). Further, the same negative or positive voltage is applied to all the pixel electrodes, so that liquid crystals can be driven (orientated) more uniformly throughout the liquid crystal cell under the electric field, the production costs can be decreased, the process can be simplified, and the viewing angles of the LCD device can become more symmetrical.

In the present embodiment, the protruded common electrodes 6 and pixel electrodes 7 may be formed of a transparent conductive material, and vertical cross-sections thereof may be formed into an isosceles trapezoid as shown in FIG. 2, or may be formed into an isosceles triangle or any other suitable geometric shape. The penetrating effect of the electric field formed by the isosceles trapezoid electrode is preferable, and widths of upper and lower lines of the isosceles trapezoid and the interval between the electrodes can be determined in a suitable range, and the values may be obtained through a simulation in order to reduce driving voltages and increase transmittance.

For example, the protruded common electrodes and pixel electrodes may be formed by an exposing process, a photolithography process and an etching process.

FIG. 2 is a schematic view for showing the state of the liquid crystal cell without being applied with driving voltages. In this state, after an incident light is transmitted through the liquid crystals, the polarization state of the light is not changed. From the layer arrangement schematic view of the liquid crystal cell in FIG. 4, the polarization of the upper polarizer 31 and the polarization of the lower polarizer 32 are orthogonally arranged, that is, the absorbing axes of the upper polarizer 31 and the lower polarizer 32 are arranged perpendicular to each other. A polarizer can block the light being perpendicular to the absorbing axis of the polarizer, thus in the configuration of FIG. 4, the light can be absorbed by the upper polarizer to show a dark state when the upper polarizer and the lower polarizer are orthogonally arranged.

Figure 4:
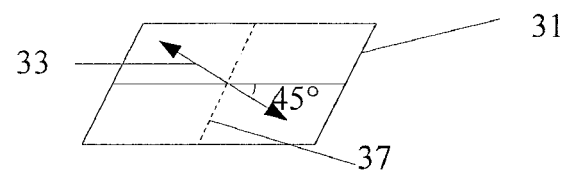
FIG. 4 is a layer arrangement schematic view of the liquid crystal cell in the blue phase liquid crystal display device according to an embodiment of the disclosed technology.
Figure 4:
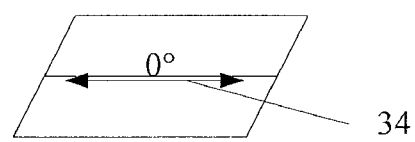
Figure 4:
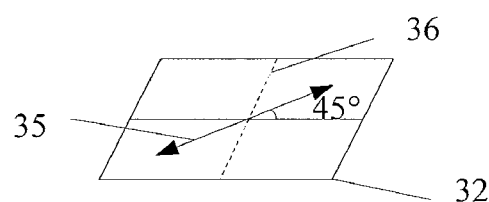

FIG. 3 is a schematic view for showing the state of the liquid crystal cell with being applied driving voltages. As shown in FIG. 4, the angle between the orthographic projection 37 of the pixel electrodes or the common electrodes on the upper polarizer and the absorbing axis 33 of the upper polarizer is 135°, and the angle between the orthographic projection 36 of the pixel electrode or the common electrode on the lower polarizer and the absorbing axis 35 of the lower polarizer is 45°. Thus, when voltages are applied, as shown in FIG. 3, the optical axis 34 of the liquid crystals and the absorbing axis of the upper polarizer and the lower polarizer may form an angle of 45° or 135° under the generated horizontal electric field, an optical path difference $\Delta n$, which can be expresses as an equation: $\Delta n = \lambda k E^2$, can be generated (Kerr Effect), where "$\lambda$" is a vacuum wavelength, "k" is a Kerr constant and E is a electric field intensity. As a result, the polarization state of incident light can be changed after the incident light is transmitted through the liquid crystal layer, the light can deflected after passing by liquid crystal molecules, and the light can be transmitted through the upper polarizer and thus, a bright state display can realized. Because the electrode field strength can be changed with driving voltages, the driving voltages can be controlled to make the optical path difference Δn to satisfy an equation: $\Delta n*d=\lambda/2$, where "λ" is a vacuum wavelength, and "d" is a distance between the lower surface of the upper insulation layer and the upper surface of the lower polarizer, in order to realize the displaying with a large brightness.

In the present embodiment, the lower polarizer is arranged with the angle as shown in FIG. 4; however, in other examples, the lower polarizer can be arranged at any other suitable angle with respect to the electrodes, as long as angles between the upper polarizer and the optical axis of the liquid crystal and the lower polarizer are similar to these in the present embodiment.

In the embodiment of the disclosed technology, by alternately arranging the common electrodes and the pixel electrodes on the upper and lower substrates, the liquid crystals with a W node distribution can be obtained (as shown in FIG. 3), so the generated horizontal electric field is compensated and enhanced, and as a result, compared with the conventional IPS mode blue phase LCD as shown in FIG. 1, the same horizontal electric field strength can be obtained with relatively small driving voltages, the driving voltages of the blue phase liquid crystal can be decreased; meanwhile, the liquid crystals with a W node distribution can have a multi-domain distribution effect so that an excellent viewing angle property can be obtained.

An embodiment of the disclosed technology further provides a method for manufacturing a blue phase liquid crystal display device, comprising the following steps:

providing a thin film transistor substrate;

providing a color filter substrate disposed above and opposite to the thin film transistor substrate;

forming a plurality of pixel electrodes disposed on a surface of the thin film transistor substrate facing the color filter substrate and protruded toward the color filter substrate, wherein negative pixel electrodes and positive pixel electrodes are alternately disposed;

forming a plurality of common electrodes disposed on the color filter substrate so that orthographic projections of the common electrodes and the pixel electrodes on the same parallel plane are alternately disposed at an equal interval; and providing by for example injecting or dropping a blue phase liquid crystal layer between the thin film transistor substrate and the color filter substrate.

The pixel electrodes which are applied a voltage larger than that of the common electrodes are the positive pixel electrodes, while the pixel electrodes which are applied a voltage smaller than that of the common electrode are the negative electrodes.

Further, in an example, the method may further comprise: forming a lower polarizer below the thin film transistor substrate; and forming an upper polarizer above the color filter substrate.

For example, the thin film transistor substrate comprises: a lower glass substrate formed on the lower polarizer and a lower insulation layer formed on the lower glass substrate; the color filter substrate comprises: an upper polarizer, an upper glass substrate formed below the upper polarizer, a color filter layer formed below the upper glass substrate, and an upper insulation layer formed below the color filter layer.

Furthermore, in order to make the liquid crystals to orientated more uniformly in the liquid crystal cell under the generated electric field, decrease the production costs, simplify the process and make viewing angles more symmetrical, a plurality of pixel electrodes may be arranged at an equal interval on the lower insulation layer, and a plurality of common electrodes may be arranged at an equal interval on the upper insulation layer. The positive and negative pixel electrodes may be further applied the same positive and negative voltages.

For example, by using an exposing process, a photolithography process and an etching process, positive and negative pixel electrodes that alternately arranged may be formed at an equal interval with a transparent conductive material on the lower insulation layer, and a plurality of common electrodes may be formed at an equal interval with a inorganic or organic transparent conductive material on the upper insulation layer. The examples of the transparent conductive material include indium tin oxide (ITO), indium zinc oxide (IZO), and the like.

Herein, vertical cross-sections of the pixel electrodes and the common electrodes may be formed in an isosceles trapezoid or an isosceles triangle, or may be formed into any other suitable geometric shape. The penetrating effect of the electric field formed by the isosceles trapezoid electrode is preferable, and widths of upper and lower lines of the isosceles trapezoid and the interval between the electrodes can be determined in a suitable range, and the values may be obtained through a simulation in order to reduce driving voltages and increase transmittance.

Further, a blue phase liquid crystal layer is provided into between the thin film transistor substrate and the color filter substrate, for example, by injecting the blue phase liquid crystal layer between the upper insulation layer and the lower insulation layer.

Further, in the present embodiment, the upper polarizer 31 and the lower polarizer 32 may be orthogonally arranged as shown in FIG. 4, the angle between the orthographic projection 37 of the pixel electrodes or the common electrodes on the upper polarizer and the absorbing axis 33 of the upper polarizer 33 is 135° for example, and the angle between the orthographic projection 36 of the pixel electrodes or the common electrodes on the lower polarizer and the absorbing axis 35 of the lower polarizer is 45° for example. Thus, when driving voltages are applied, as shown in FIG. 3, the blue phase liquid crystal is brought into an anisotropic state, the optical axis 34 of the liquid crystal and the absorbing axis of the upper polarizer and the lower polarizer may form an angle of 45° or 135° under a horizontal electric field, an optical path difference Δn, which can be expresses as an equation: $\Delta n=\lambda kE^2$, can be generated (Kerr Effect), where "λ" is a vacuum wavelength, "k" is a Kerr constant and E is a electric field intensity. As a result, the polarization state of incident light can be changed after the incident light is transmitted through the liquid crystal layer, the light can deflected after passing by liquid crystal molecules, and the light can be transmitted through the upper polarizer and thus, a bright state display can realized. Because the electrode field strength can be changed with driving voltages, the driving voltages can be controlled to make the optical path difference Δn to satisfy an equation: $\Delta n*d=\lambda/2$, where "λ" is a vacuum wavelength, and "d" is a distance between the lower surface of the upper insulation layer and the upper surface of the lower polarizer, in order to realize the displaying with a large brightness.

In other examples, the lower polarizer can be arranged at any other suitable angle with respect to the electrodes, as long as angles between the upper polarizer and the optical axis of the liquid crystal and the lower polarizer are similar to these in the present embodiment.

In an embodiment of the disclosed technology, by alternately arranging the common electrodes and the pixel electrodes on the upper and lower substrates, the liquid crystals with a W node distribution can be obtained (as shown in FIG. 3), so the generated horizontal electric field is compensated and enhanced, and as a result, compared with the conventional IPS mode blue phase LCD as shown in FIG. 1, the same horizontal electric field strength can be obtained with relatively small driving voltages, the driving voltages of the blue phase liquid crystal can be decreased; meanwhile, the liquid crystals with a W node distribution can have a multi-domain distribution effect so that an excellent viewing angle property can be obtained.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A blue phase liquid crystal display device, comprising:
a lower polarizer;
a thin film transistor substrate, formed above the lower polarizer;
a color filter substrate, disposed above and opposite to the thin film transistor substrate;
an upper polarizer, formed above the color filter substrate;
a plurality of pixel electrodes, disposed on a surface of the thin film transistor substrate facing the color filter substrate and protruded toward the color filter substrate, wherein the plurality of pixel electrodes comprise negative pixel electrodes and positive pixel electrodes being alternately disposed;
a plurality of common electrodes, disposed on the color filter substrate, wherein orthographic projections of the common electrodes and the pixel electrodes on a same plane are alternately disposed at an interval; and
a blue phase liquid crystal layer, provided between the thin film transistor substrate and the color filter substrate,
wherein the positive pixel electrodes are applied with a voltage larger than that of the common electrodes, and the negative pixel electrodes are applied with a voltage smaller than that of the common electrode, and
a first electric field is formed from the negative pixel electrode and the positive pixel electrode, a second electric field is formed from the negative pixel electrode and the common electrodes and a third electric field is formed from the positive pixel electrode and the common electrodes,
wherein the positive pixel electrodes are applied a same voltage with the same magnitude by a first voltage source, and the negative pixel electrodes are applied a same voltage with the same magnitude by a second voltage source, the first voltage source is different from the second voltage source, the positive pixel electrodes are connected with the first voltage source and the negative pixel electrodes are connected with the second voltage source,
wherein a vertical cross-section of each of the plurality of common electrodes is formed in an isosceles triangle shape, and a vertical cross-section of each of the plurality of pixel electrodes is formed in an isosceles triangle shape,
wherein an electric field formed by the common electrodes and the negative and positive pixel electrodes is in a W node distribution.

2. The blue phase liquid crystal display device according to claim 1, further comprises:
a lower insulation layer, formed on the thin film transistor substrate.

3. The blue phase liquid crystal display device according to claim 1, further comprises:
a color filter layer, formed below the color filter substrate; and
an upper insulation layer, formed below the color filter layer.

4. The blue phase liquid crystal display device according to claim 1, wherein an absorbing axis of the upper polarizer and an absorbing axis of the lower polarizer are arranged orthogonally to each other.

5. The blue phase liquid crystal display device according to claim 4, wherein an angle between an optical axis of the blue phase liquid crystal and an absorbing axis of the upper polarizer is 45° or 135 when voltages are applied.

6. A method for manufacturing a blue phase liquid crystal display device, comprising:
providing an upper polarizer;
providing a thin film transistor substrate on the upper polarizer;
providing a color filter substrate disposed above and opposite to the thin film transistor substrate;
forming a plurality of pixel electrodes disposed on a surface of the thin film transistor substrate facing the color filter substrate and protruded toward the color filter substrate, wherein the plurality of pixel electrodes comprise negative pixel electrodes and positive pixel electrodes being alternately disposed;
forming a plurality of common electrodes disposed on the color filter substrate so that orthographic projections of the common electrodes and the pixel electrodes on a same plane are alternately disposed at an interval; and
providing a blue phase liquid crystal layer between the thin film transistor substrate and the color filter substrate,
providing a lower polarizer above the color filter substrate,
wherein the positive pixel electrodes are applied with a voltage larger than that of the common electrodes, and the negative pixel electrodes are applied with a voltage smaller than that of the common electrode,
a first electric field is formed from the negative pixel electrode and the positive pixel electrode, a second electric field is formed from the negative pixel electrode and the common electrodes and a third electric field is formed from the positive pixel electrode and the common electrodes,
wherein the positive pixel electrodes are applied a same voltage with the same magnitude by a first voltage source, and the negative pixel electrodes are applied a same voltage with the same magnitude by a second voltage source, the first voltage source is different from the second voltage source, the positive pixel electrodes are connected with the first voltage source and the negative pixel electrodes are connected with the second voltage source,
wherein a vertical cross-section of each of the plurality of common electrodes is formed in an isosceles triangle shape, and a vertical cross-section of each of the plurality of pixel electrodes is formed in an isosceles triangle shape,
wherein an electric field formed by the common electrodes and the negative and positive pixel electrodes is in a W node distribution.

7. The method according to claim 6, wherein an absorbing axis of the upper polarizer and an absorbing axis of the lower polarizer are arranged orthogonally to each other.

8. The method according to claim 7, wherein an angle between an optical axis of the blue phase liquid crystal and an absorbing axis of the upper polarizer is 45° or 135 when voltages are applied.

* * * * *